No. 749,162. PATENTED JAN. 12, 1904.
T. BRUECK.
PHOTOGRAPHIC SHUTTER.
APPLICATION FILED FEB. 14, 1901.

MODEL. 4 SHEETS—SHEET 1.

Witnesses.
Walker B. Payne
F. Willard Rich

Inventor.
Theodor Brueck
by Frederick H. Church
his Attorney.

THE NORRIS PETERS CO., PHOTO-LITHO., WASHINGTON, D. C.

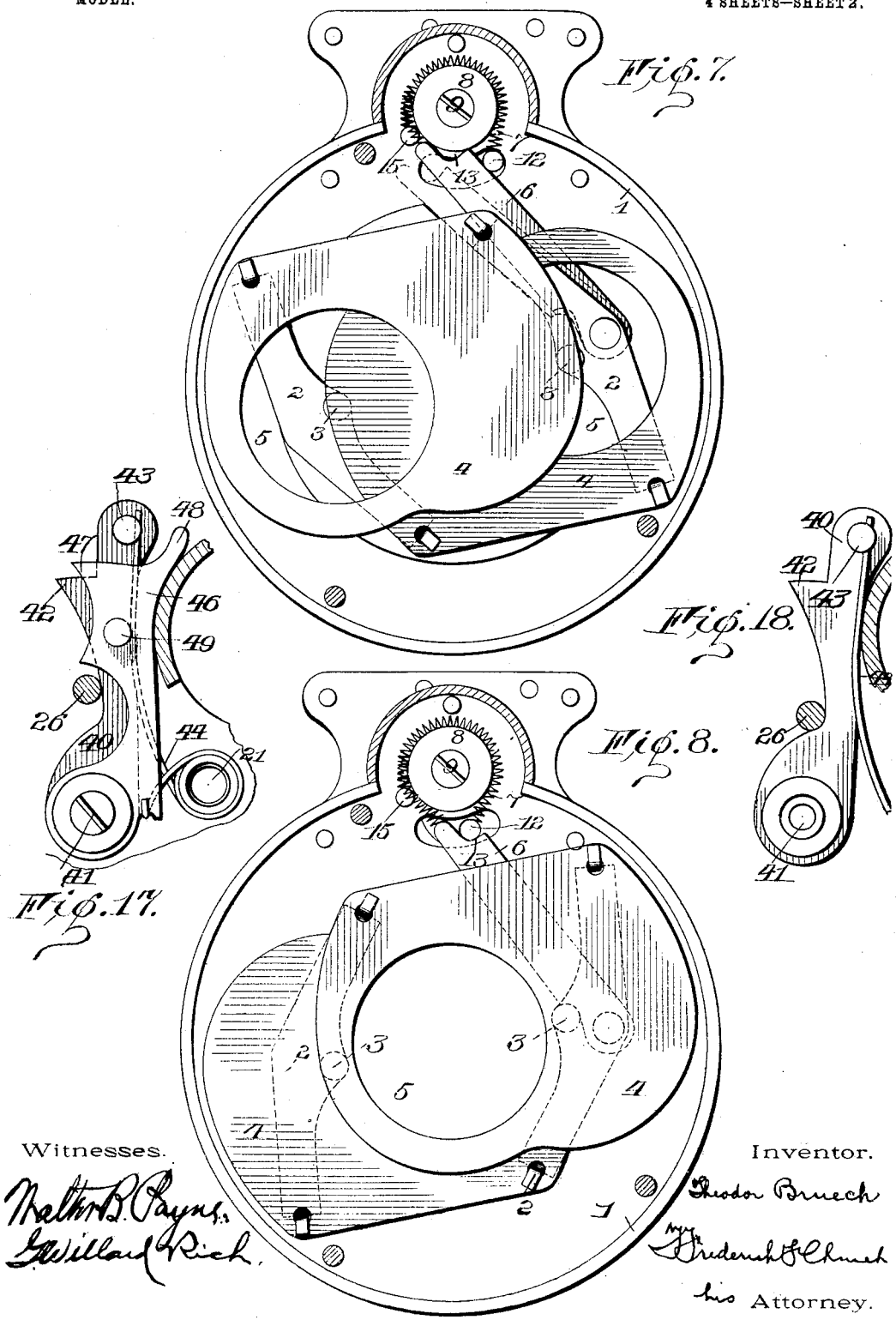

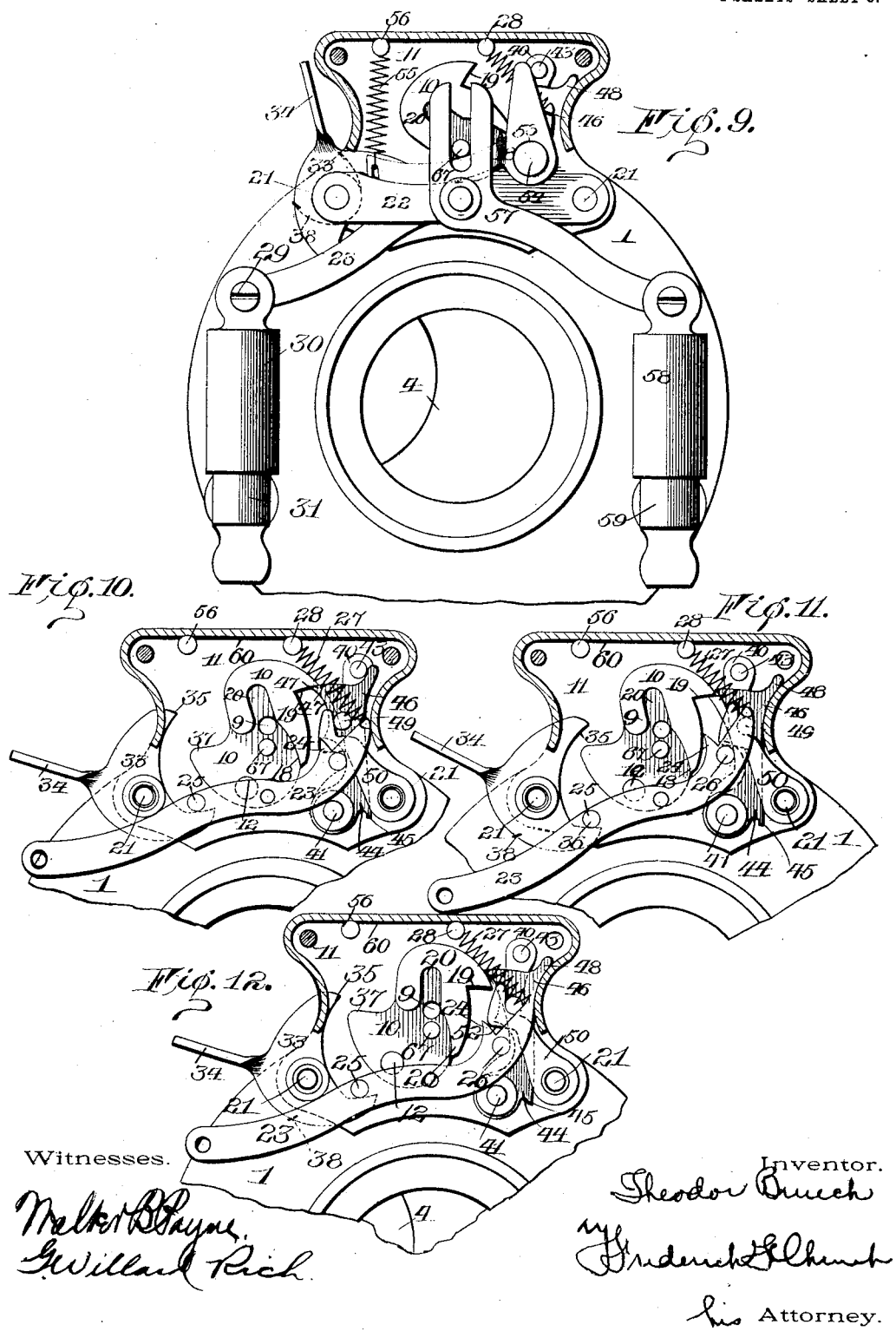

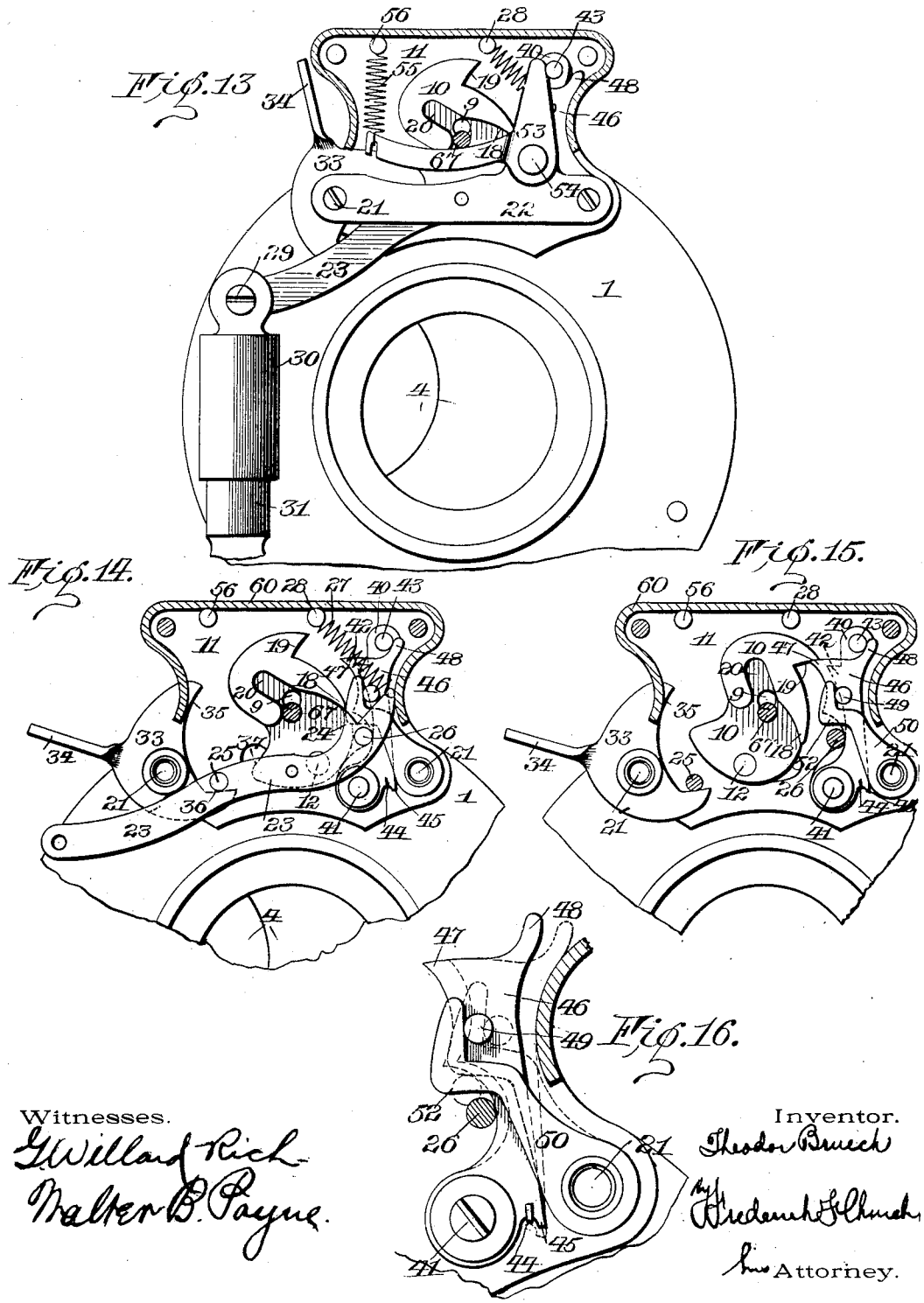

No. 749,162. Patented January 12, 1904.

UNITED STATES PATENT OFFICE.

THEODOR BRUECK, OF ROCHESTER, NEW YORK, ASSIGNOR TO BAUSCH & LOMB OPTICAL COMPANY, OF ROCHESTER, NEW YORK, A CORPORATION OF NEW YORK.

PHOTOGRAPHIC SHUTTER.

SPECIFICATION forming part of Letters Patent No. 749,162, dated January 12, 1904.

Application filed February 14, 1901. Serial No. 47,266. (No model.)

*To all whom it may concern:*

Be it known that I, THEODOR BRUECK, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference-numerals marked thereon.

My present invention relates to photograpic shutters of that class particularly adapted for making bulb, time, and instantaneous and also automatically-timed exposures, and has for its object to improve the construction and operation of the mechanisms for setting and controlling the operation of the shutter, to provide a single operating part movable in two opposite directions, one movement preparing and setting the shutter-actuating mechanism for operation and the movement in the opposite direction causing its release, and, further, to provide an improved adjusting mechanism regulating the connection with a retarding device, whereby the speed with which the shutter closes may be determined; and it consists in devices for accomplishing these results and in combinations of parts, all as will be hereinafter fully described and the novel features pointed out in the claims at the end of this specification.

Figure 6:
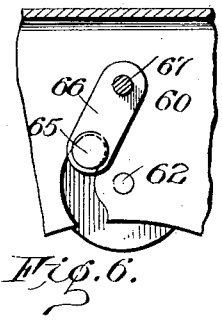
Figures 1, 2:
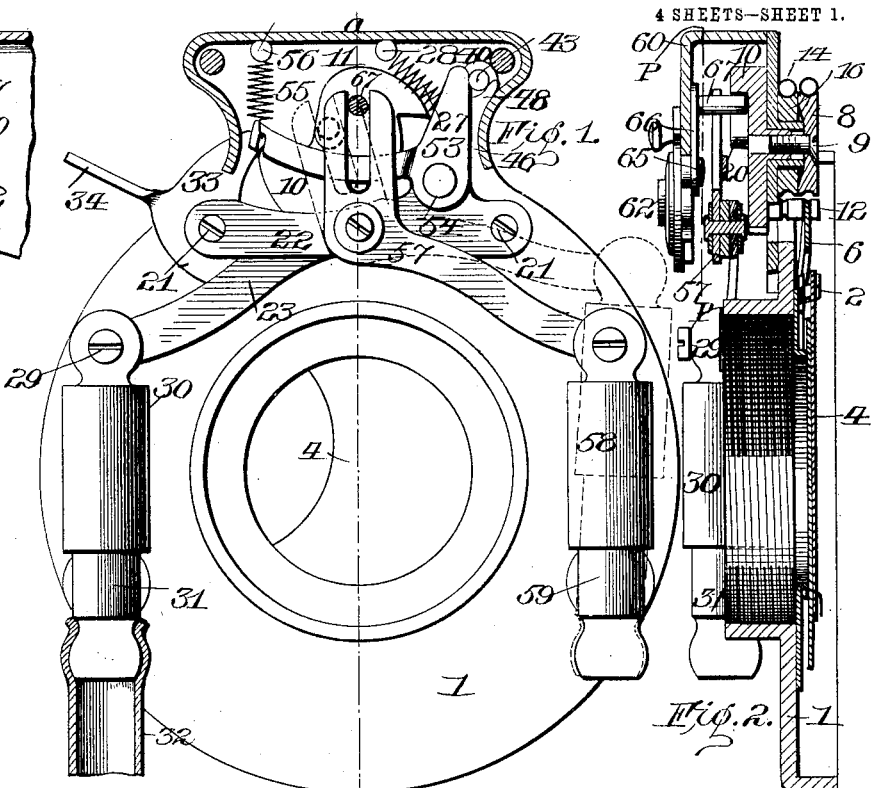
Figure 4:
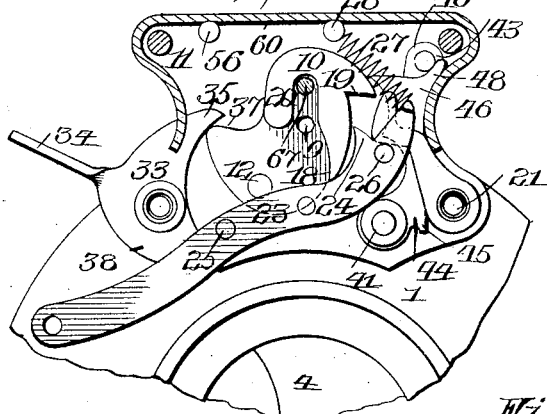
Figure 5:
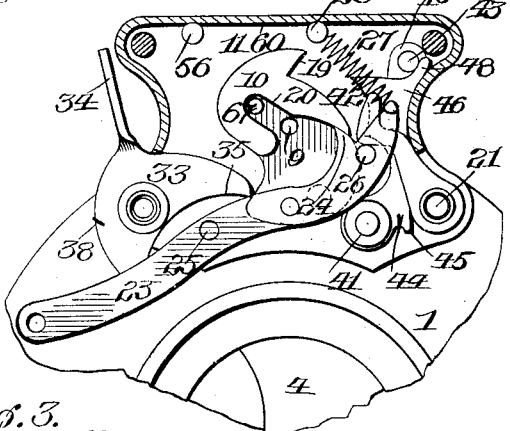
Figure 3:
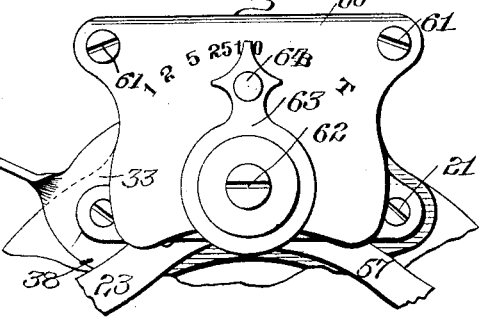

In the accompanying drawings, Figure 1 is a front elevation of a shutter constructed in accordance with my invention, the cover-plate and the adjustable pin thereon being cut on the line $p\,p$, shown in Fig. 2; Fig. 2, a vertical sectional view taken on the line $a\,a$ of Fig. 1; Fig. 3, a front elevation of the adjusting devices; Fig. 4, an enlarged view of the shutter detaining and releasing devices in normal position; Fig. 5, a similar view showing the motor devices under tension; Fig. 6, a detail view of the rear side of the cover-plate of the operating mechanism; Fig. 7, a view of the shutter-wings and their actuating mechanism in normal position after the shutter has been operated and showing in dotted lines the position when set for operation; Fig. 8, a similar view showing the shutter open, as during a time exposure; Fig. 9, a view similar to Fig. 1, showing the operating parts set for a time exposure; Fig. 10, a similar view showing the position of the parts when the shutter is open and before pressure has been removed from the setting and releasing member; Fig. 11, a similar view with the shutter maintained open; Fig. 12, a similar view when the shutter is closed; Figs. 13, 14, and 15, views showing the positions of the controlling mechanisms when making a bulb exposure; Figs. 16, 17, and 18, detail views of the detaining stops or catches.

Similar reference-numerals in the several figures indicate similar parts.

While my present invention may be applied to a shutter of any type, whether embodying one or more leaves or blades, sliding, pivoted, or otherwise, I have in the present embodiment shown it applied to a form extensively used and embodying the case or plate 1, recessed at the rear, within which casing are arranged two levers 2, pivoted at 3 and connected at opposite ends to slightly-overlapping shutter wings or plates 4 and each provided with an aperture 5, which apertures are adapted to register in line with the lens-opening for the purpose of making an exposure. Pivoted to one of the levers 2 is a link or arm 6, connected at its upper end to a spring 7, encircling a disk or stud 8, connected to the arbor 9 of an oscillating master member 10, located on the other side of the plate 1 and preferably on the plate or support 11, secured to the upper end of the casing 1. The opposite end of the spring 7 is connected to a pin or projection 12, attached to the rear side of the master member 10, operating through a slot in the support 11 and in position to be engaged by a shoulder 13, formed upon the link 6, as will be explained.

14 indicates an operating-spring, connected at one end to a stationary stud 15 and at the other to the pin 12 and extending around a pulley or roller 16, arranged concentric with the stud of the master member. The normal position of the parts of the shutter proper is that shown in full lines in Fig. 7; but when the master member is rotated so that the pin 12 will be in the position shown in dotted lines in said figure the spring 14 will be placed under tension and said stud will engage the shoulder 13 of the link, this operation being accomplished without opening the shutter-plates, as the link 6 will shift laterally for the purpose. When the master member is moved in the opposite direction by its spring, the link 6 will be operated longitudinally, as shown in Fig. 8, causing the leaves to open, the apertures in the present embodiment being in line, and then as the movement continues the pin 12 will pass off the shoulder 13, allowing the spring 7 to return the shutter members to first position.

The master member 10 and its controlling devices to which my present invention particularly relates are, as stated, located at the front of the shutter and the former is adapted to rotate about the arbor or center 9 and is provided on its face with shoulders or engaging portions 18 and 19, projecting at one edge, and in its face is provided a radial slot 20. Secured to the face of the casing or the support 11 are pillars or studs 21, upon which is mounted a bridge-piece 22, upon the inner side of which is pivoted a catch-lever 23, having the engaging shoulder or projection 24, and upon its rear side the pins 25 and 26, the end of said catch-lever being connected by a spring 27 with a stationary stud or projection 28. The lower end of the catch-lever 23 is extended downward and is pivoted at 29 to a pneumatic engine, embodying a movable cylinder 30, extending over a stationary hollow portion 31, connected by a tube 32 with a suitable bulb. Pivoted on one of the pillars 21 is a setting and releasing member in the form of a lever or plate 33, having an operating-handle 34 and the inwardly-extending arms 35 and 36, the latter being adapted to coöperate with the pin 25 on the catch-lever 23 and the former adapted to coöperate with a shoulder or projection 37, formed upon the master member 10, said member 33 being normally held in engagement with the pin 25 by a small spring 38, encircling the pillar and connected to said member.

40 indicates a stop or catch pivoted at 41, having a shoulder or projection 42, adapted to coöperate with the engaging shoulder 19 of the master member and provided with a pin or projection 43, a spring 44 engaging said stop or catch and adapted to throw it toward the master member. This spring extends around the pillar or post and its end is connected to a shoulder 45 on the stop or catch 46, pivoted upon the stud or pin 41 and provided with an engaging shoulder or projection 47, adapted to coöperate with the projection 19 on the master member, with an extension or arm 48 adapted to coöperate with the pin 43 when the latter is moved outwardly and is also provided with a pin or projection 49, with which latter coöperates the rear side of a small lever 50, pivoted upon one of the posts 21 on the support, the shoulder 52 of the abutment or lever 50 being arranged in the path of the pin 26 on the catch-lever 23, and the construction being such that when the catch 23 is turned to release the master member the catch-lever 46 will be moved out of the path of the projection 19.

53 indicates a bell-crank lever, pivoted at 54 upon the bridge 22, having one arm engaged by a spring 55, secured at 56 to the support 11, the other arm of said lever engaging with the inner side of the pin 43, said spring 55 normally overcoming the tension of the spring 44 and holding the catch-plates 40 and 46 out of engagement with the master member. Pivoted upon the bridge-piece 22 is a lever 57, having the upper slotted or bifurcated end, and connected at the other end to the movable cylinder 58, extending over a piston or abutment 59, closed at its lower end, said cylinder and piston fitting closely enough to form a retarding device or dash-pot of substantially constant force, the rate of the escape of air being regulated by the space or relatively loose fit between the parts.

60 indicates a casing or cover plate extending over the operating parts just described, being secured by screws 61 and having journaled therein a stud or arbor 62, to the outer end of which is connected an index plate or arm 63, having an operating-handle 64, and coöperating with a scale arranged upon the front of the plate 60. The index plate or arm 63 is provided on its rear side with a crank-pin 65, extending through a slot in the plate and connected at one end with a link 66, the other end of which is provided with a pin 67, extending through the upper slotted or bifurcated end of the retarding-lever 57 over the horizontal portion of the lever or arm 53 and into the radially-extending slot 20 of the master member, as shown in Figs. 1, 2, and 13. The scale upon the plate 60 is provided with suitable numerals and letters indicating seconds and fractions thereof on the left and containing the letter "B," indicating a bulb-exposure, and the letter "T," indicating a time-exposure, and the connections between the index and the controlling parts of the shutter are such that when the index points to "1" on the scale the shutter is set for exposures of one second. When it is at "100," the shutter is set for an exposure of one one-hundredth of a second or practically instantaneous. When it coöperates with the letter "B," the shutter is set for bulb-exposures, and at "T" for time-exposures, in the manner now about to be described.

*Time exposures.*—When the shutter is set for time exposures, the index is moved to register with the letter "T" and the pin 67 connected thereto is moved outward to the position shown in Fig. 9, being then at or below the lower end of the radial slot in the master member, so as not to be operated thereby, and moving the upper portion of the lever 53 to the extreme left, permitting the spring 44 to throw the catch-levers 40 and 46 inward or toward the master member. Upon moving the operating-handle 34 of the setting and releasing member 33 upwardly to the position shown in Figs. 5 and 9 the shoulder 35 thereon will engage the shoulder 37 on the master member, turning the latter to the position shown and moving the operating-pin 12 from the position shown in full to that shown in dotted lines in Fig. 7, or until the projection 24 on the catch-lever 23 engages the shoulder 18 on the master member, thereby placing the motor-spring 14 under tension. The shutter may now be released by downward pressure upon the outer end of the member 33 or by means of the pneumatic engine 30 31, which will disengage the projections 24 and 18 and the motor-spring of the master member will rotate the latter until the projection 19 engages the inner end 47 of the catch 46, as shown in Fig. 10. Then upon releasing the pressure upon the catch-lever 23 the spring 27 will raise the latter, and the pin 26 thereon will move the lever or abutment 50 upwardly and outwardly, as shown in dotted lines in Fig. 16, and through it the catch 46, releasing the latter from the master member, thereby allowing the master member to move a very short distance until the projection 19 thereon is engaged by the shoulder or end 42 of the catch 40, as shown in Fig. 11, and the catch-lever 23 is in normal position, the pin 12 on the master member at this time being in the position shown in Fig. 8 and holding the shutter members open. By a second operation of the catch 23 by the operation either by the member 33 or the bulb the pin 26 engages the member 40, which is held against it by the spring 44, as in Figs. 16 and 17, moving the latter out of engagement with the master member and allowing the motor-spring of the latter to complete its movement, disengaging the pin 12 from the link 6 and allowing the shutter to be closed by its spring 7, the parts then being in the position shown in Fig. 12.

*Bulb exposures.*—In making a bulb exposure the index is registered with the letter "B" on the scale-plate, the pin 67 then being out of engagement with the slot of the master member, but allowing the lever 53 and the catch-lever 40 to move inwardly only far enough to permit the shoulder 47 of the catch 46 to project in the path of the projection 19 on the master member. The master member is now set as before, and the parts are in the position shown in Fig. 14. Upon the release of the catch 23 the master member will be turned by its spring and will be arrested by the catch 46, as shown in Fig. 15, and the shutter will be held open, but upon releasing the pressure upon the catch 23 the end carrying pin 26 thereon will rise and the pin will engage and move the catch 46 out of engagement, as shown in Fig. 17, allowing the master member to complete its operation and close the shutter.

*Instantaneous exposures.*—When it is desired to make an instantaneous exposure, say of one one-hundredth of a second, the index is registered with the one one-hundredth mark on the scale, the pin 67 connected thereto being then about on a line with the center of the master member, but out of engagement with the sides of the slot therein, and permitting the spring 55 to operate the lever 53 far enough to throw both catches 40 and 46 out of the line of movement of the projection 19 on the master member, so that upon the release of the latter said member will make a complete movement, causing the shutter to open and close, as will be understood.

*Automatically-timed exposures.*—For automatically-timed exposures it is only necessary to move the index into registry with the proper numbers on the scale, the highest number—as, for instance, one second—indicating the greatest length of exposure for which the shutter is adapted, this operation moving the pin 67 upwardly in the slot 20 of the master member and also in the slotted end of the lever of the retarding device and farther from the pivot of the latter, so that the lever 57 will partake of the motions of the master member when moved in both directions and the amplitude of relative movement of the piston and cylinder of the retarding device will regulate the length of time the master member occupies in closing the shutter, the opening operation of the shutter being practically instantaneous by reason of the small amount of movement permitted the pin 12 before the shutter-leaves are thrown open. If a long exposure is desired, the pin 67 is moved farther from the pivot of both the lever 53 and the master member and if shorter closer to them, the variations of speed being accomplished by the adjustment of the pin.

While in the present embodiment the amount of movement of the retarding device is dependent upon the leverage between the master member and the lever 53, and this is preferable, I do not desire to be confined to this particular arrangement or relation of the parts.

While the master member in the present instance is separate from the shutter, but actuates and controls its movements, I do not desire to be confined to this particular structure, as the invention is broader and involves in one of its broad features the setting, releasing, and controlling of the shutter by a single part, also the employment of only two movable parts, one of which, the index plate or lever, determines the kind and duration of the exposure, and the other, the member 33, places the shutter-operating devices in operative condition and also controls the operation of the shutter.

The term "bulb exposure" is used herein in the sense that it is understood by those skilled in the art to denote an exposure in which the shutter is held open by pressure upon the part that controls the stops or catches, such as the lever 23 or the bulb of the pneumatic engine operating it.

It will be noted that the pin 26 engages directly with the catch-lever 40 above its pivot when moved downwardly and also operates the catch-lever 46 through the lever 50 when moved upwardly, as in dotted lines in Fig. 16, and that the stops or catch-levers 40 and 46 are engaged by the coöperation of the pin 43 and projection 48.

I claim as my invention—

1. The combination with a photographic shutter, a spring-motor for operating it, a latch connection between the motor and shutter yielding in one direction to permit setting the motor without operating the shutter and a catch for retaining the motor, of a pivoted operating member for placing the spring under tension when operated in one direction on the pivot and coöperating with the catch for releasing the motor member when operated on the pivot in the opposite direction.

2. The combination with a photographic shutter, a motor for opening and closing it, a latch connection between the motor and shutter yielding in one direction to permit setting the motor without operating the shutter, a catch for retaining the motor when set to operate the shutter, and detaining devices for holding the shutter open, of a single member operable in one direction to place the motor under tension and in another direction to operate the catch and control the detaining devices said detaining devices being separate from and adjustable independently of the movable member.

3. The combination with a photographic shutter, a spring-motor for closing it, a latch connection between the motor and shutter yielding in one direction to permit setting the motor without operating the shutter, a catch for detaining the motor when set to operate the shutter, and relatively adjustable detaining devices for holding the shutter open, of a member movable in two directions and coöperating with the motor to set it when moved in one direction and operating the catch and controlling the detaining devices when operated in the other direction.

4. The combination with a photographic shutter, a movable master member adapted during its movement to cause the shutter to open and close, a motor device for operating the member, and a catch for holding the member against the force of the motor, of a movable member movable in one direction to operate the master member against its spring and in another direction to cause the release of the catch.

5. The combination with a photographic shutter, a movable master member adapted during its movement to cause the shutter to open and close, a motor device for operating the member, and relatively adjustable catches for arresting the master member during its movement, of a member movable in one direction to operate the master member against its motor and movable in another direction to coöperate with and control the catches.

6. The combination with a photographic shutter, a movable master member adapted during its movement to cause the shutter to open and close, a motor for operating the member, a catch for holding the member against the force of the motor, and relatively adjustable catches coöperating with the member after the disengagement of the first-mentioned catch, of a movable member operable in one direction to set the master member against the force of the motor and controlling the other catches when operated in the other direction.

7. The combination with a photographic shutter, a movable master member adapted during its movement to cause the shutter to open and close, a motor for operating the member, and a spring-operated catch for holding the master member when the shutter is closed, and two catches coöperating with the master member and operated and controlled by the movements of the first-mentioned catch, of a movable member operating the master member against the motor when operated in one direction and coöperating with the catch when moved in another direction.

8. The combination with a photographic shutter, a movable master member, a spring for operating it, a catch for holding the master member, two separate catches for controlling the movement of the master member and controlled by the first-mentioned catches, and means for varying the relations between the two catches, of a movable member coöperating with the master member when moved in one direction to set it and coöperating with the catch to actuate and control it when moved in another direction.

9. The combination with a photographic shutter, a spring-operated master member coöperating therewith to open and close the shutter by a continued movement in one direction, a catch for holding the master member when set, two stops adapted to separately engage the master member during its movement and controlled by the first-mentioned catch, and means for varying the relations of the two stops toward each other, and the holding-catch, of a movable member coöperating with the master member to set it when moved in one direction and operating and controlling the holding-catch when moved in another direction.

10. The combination with a photographic shutter, motor devices for operating it, and a latch connection between the shutter and motor devices permitting the latter to be set without operating the shutter, of a holding-catch for preventing the opening of the shutter, two detaining-stops for holding the shutter open adjustable relatively to each other and to the holding-catch, and a movable member coöperating with the motor devices to set them when moved in one direction and adapted to operate and control the holding-catch and stops when moved in another direction.

11. In a photographic shutter, the combination with a movable master member, the holding-catch therefor, two stops each adapted to engage the master member, one of said stops being operated by the holding-catch to release it, and the lever or abutment 50 operated upon by the holding-catch and coöperating with the other stop to release it.

12. In a photographic shutter, the combination with a slotted master member, of a retarding device of constant force, a slotted lever connected thereto and an adjustable projection operating in both slots to vary the relative movements of the parts.

13. In a photographic shutter, the combination with a pivoted slotted master member, of a retarding device, a slotted lever connected thereto and an adjustable projection operating in both slots for varying the relative movements of the parts.

14. In a photographic shutter, the combination with a pivoted master member having the radial slot therein, of a retarding device, a slotted lever connected thereto, a projection adjustable in the slots in the two parts for varying their relative movements.

15. In a photographic shutter, the combination with a movable master member and a retarding device, of an adjustable abutment supported independently of either and operated upon by one and adapted to engage the other to vary their relative operation.

16. In a photographic shutter, the combination with the movable master member, of a retarding device of constant force, a lever connected thereto, the pivoted arm, and the link connected eccentrically thereto having a projection at its free end coöperating with and adjustable upon the master member and the lever of the retarding device whereby the relative movements of the latter may be controlled.

17. In a photographic shutter, the combination with the pivoted master member having the slot, of the retarding device, the pivoted slotted lever connected thereto, the pivoted arm, the link connected eccentrically thereto and the pin on the link coöperating with and adjustable in the slots in the member and lever respectively.

18. In a photographic shutter, the combination with the pivoted oscillatory master member having the radial slot, of the pneumatic retarding device, the pivoted lever connected thereto having the slotted end extending over the master member and the movable link having the pin adjustable in the slots in the member and lever respectively.

19. In a photographic shutter, the combination with the master member having the slot and the time-stops coöperating with the member, of the retarding device, the slotted lever connected therewith, the movable pin adjustable in the slots in the member and lever, and connections between the time-stops and the pin whereby the former will be moved out of coöperative relation with the master member when adjusted in one direction.

20. In a photographic shutter, the combination with the master member having the slot, and the automatically-engaging time-stops coöperating therewith, of the retarding device, the slotted lever connected therewith, the adjustable projection operating in the slots in the member and lever, and connections between it and the time-stops for holding the latter out of engagement when adjusted in one direction.

21. In a photographic shutter, the combination with the master member having the slot, the automatically-engaging time-stops coöperating therewith, the spring-operated member for moving the time-stops out of engagement, of a retarding device, a slotted lever connected therewith, and an adjustable projection movable in the slots of the lever and master member and coöperating with the spring-operated member when operated in one direction to permit the engagement of the time-stops with the master member.

22. In a photographic shutter, the combination with the master member having the slot, and the automatically-engaging time-stops coöperating therewith, one of said stops controlling the movement of the other, and a spring-actuated member operating upon the controlling time-stop, of a retarding device, a slotted lever connected thereto, and a movable projection adjustable in the slots of the member and lever and controlling their relation and adapted when moved in one direction to move the spring-actuated member.

23. In a photographic shutter, the combination with the master member having the slot, the spring-actuated time-stops engaging the member in succession, and the movement of one controlling that of the other in one direction, the pivoted spring-operated lever engaging the controlling time-stop, of a retarding device, a slotted lever connected therewith, the adjustable pivoted link having the projection extending into the slots in the master member and lever and adapted to engage the spring-operated lever when disengaged from the master member.

24. In a photographic shutter, the combination with a master member and time-stops for controlling it, of a retarding device and an adjustable part between the retarding device and master member for varying their operative relation and also operating upon the time-stops to prevent the coöperation of one or both with the master member.

25. In a photographic shutter, the combination with a master member, time-stops for controlling it, and a holding-catch coöperating with the time-stops when actuated to release the master member, of a retarding device, an adjustable part between the retarding device and master member for varying their operative relation said part also controlling the relation of the time-stops and the holding-catch.

26. In a photographic shutter adapted to make time, bulb instantaneous and automatically-timed exposures, and embodying a movable member and motor therefor, the combination with said member and motor, of an adjusting device for determining the kind of exposure to be made, and a single movable part operable in one direction to set the motor for operation and in another direction to release the movable member.

27. In a photographic shutter adapted to make time, bulb, instantaneous and automatically-timed exposures, the combination with a movable member, a motor for operating it, a holding-catch, time-stops, and a retarding device for controlling the movement of the member, of an adjustable part for controlling the time-stops and retarding device with relation to the movable member, and an operating member movable in one direction to set the motor and in another direction to operate and control the operation of the holding-catch and time-stops.

28. In a photographic shutter, the combination with the master member having the projections 18 and 19, the pivoted stop 46 having the pin 49, the pivoted holding-catch 23 having the pin 26 and the lever 50 pivoted on a center separate from the pivot of the catch and located between the catch 23 and the pin 49.

29. In a photographic shutter, the combination with the master member having the projections 18 and 19, the catch 23, the stops 40 and 46, the former having the pin 43 and coöperating with the catch 46, and the spring for operating the stops toward the master member, of the pivoted lever 53 coöperating with the pin 43, and the spring for operating it.

30. The combination with the shutter proper, of an oscillatory master member, a spring for operating it, a latch connection between the member and the shutter proper, a catch for holding the member, and a movable member operable in one direction for moving the master member against its spring and in another direction for releasing the catch.

31. The combination with the shutter proper, of an oscillatory master member, a spring for operating it, a latch connection between the member and the shutter, a catch for holding the member, and a pivoted member coöperating with the master member to move it against its spring when operating in one direction on its pivot and coöperating with the catch to release the master member when moved in the opposite direction.

32. The combination with the shutter proper, of an oscillatory master member, a spring for operating it, a latch connection between the member and the shutter, a catch for holding the master member, an operating member movable in one direction for moving the master member against its spring to set it and in another direction to coöperate with and release the catch, and detaining devices for holding the master member after the release of the catch and controlled by the operating member.

33. The combination with the shutter proper, the movable master member, a spring for operating the latter in one direction, a latch connection between the member and shutter, and a catch for holding the member against the tension of its spring, of detaining devices for controlling the operation of the master member, the movement of said devices being in turn controlled by the catch, and an operating member movable in one direction to set the master member and in another direction to actuate the catch and through it the controlling devices.

34. The combination with the shutter proper, a movable master member, a spring for operating the latter in one direction, a latch connection between the member and shutter, and a catch for holding the master member against the tension of its spring, of detaining-stops for separately holding the master member intermediate the extremes of its movement, means for adjusting said stops relatively to the master member, and an operating member coöperating with the master member to set it when operated in one direction and operating and controlling the operation of the catch and stops coöperating with the master member, when operated in another direction.

35. The combination with the shutter, a movable master member for causing its operation when moved in one direction, and a spring for operating said master member, of a catch for detaining said master member with the spring under tension, two stops for holding the member in positions intermediate its extremes of movement, both adjustable relatively to the member, and an operating member coöperating with the master member to actuate it against its spring when moved in one direction and coöperating with the stop and catch when moved in another direction.

36. The combination with the shutter proper, a movable master member for causing its operation when moved in one direction, and a spring for operating said master member, of a catch for detaining the member against the tension of its spring, two detaining-stops engaging the master member intermediate its extremes of movement, springs for moving said stops into engaging position, and adjusting devices for holding either or both out of engaging position, connections between both said stops and the first-mentioned catch, and an operating member operable in one direction to move the master member against its spring until it is engaged by the first-mentioned catch and operating when moved in another direction to coöperate with and release said catch and control the movement of the master member.

37. The combination with a photographic shutter, a spring-operated motor device for operating it, a latch connection between the motor device and shutter, yielding in one direction to permit setting the motor without actuating the shutter, and a catch for retaining the motor, of a pivoted operating member, and a spring for operating it in one direction, said operating member coöperating with the motor device to place its spring under tension when operated in one direction on the pivot and against its spring, and coöperating with the catch for releasing the motor member when operated in the opposite direction.

38. The combination with the shutter proper, the movable master member, a spring for operating the latter in one direction, a latch connection between the member and shutter and a catch for holding the member against the tension of its spring, of detaining devices for controlling the operation of the master member, the movement of said devices being in turn controlled by the catch and an operating member movable in one direction to set the master member and in another direction to actuate the catch and through it the controlling devices.

39. In a photographic shutter, the combination with the case and exposing mechanism, of a motor device, a detaining device therefor, means for moving the motor device against its motive action, and adapted to coöperate with the detaining device, a retarding device, a member connecting said device with the motor device and a shiftable member for coöperating with said first member whereby to vary the leverage for action on the retarding device.

40. In a photographic shutter, the combination with a master member, an operating member for actuating it in one direction, and detaining devices for the master member controlled by the operating member, of a retarding device for governing the movement of the master member and detachably connected thereto.

41. In a photographic shutter, the combination with a master member, an operating member for actuating it in one direction, and detaining devices for the master member controlled by the operating member, of a retarding device for governing the movement of the master member, adjustably and detachably connected thereto, whereby the speed of movement of the master member may be governed.

42. In a photographic shutter, the combination with a master member, an operating member for actuating it in one direction, and detaining devices for the master member controlled by the operating member, of a retarding device of constant force, and adjustable connections between said device and the master member for varying the leverage between the parts to change the speed of operation.

43. The combination with a shutter proper, a master member for opening and closing the shutter by a movement in one direction, an operating member for moving the master member to operate the shutter, and means for returning the member to first or normal position, of a retarding device for regulating the speed of the master member.

44. The combination with a shutter proper, a master member for opening and closing the shutter by a movement in one direction, an operating device for setting the master member to operate the shutter, and means for automatically returning it to normal position, of an adjustable retarding device for retarding the movement of the master member in a direction to cause the closing of the shutter.

45. The combination with a shutter proper, a master member for opening and closing the shutter by a movement in one direction, an operating device for setting the master member to operate the shutter, and means for automatically returning it to normal position, of a retarding device of constant force, and an adjustable connection between it and the master member for varying the leverage between the retarding device and master member.

46. In a photographic shutter, the combination with a master member, an operating member for actuating it in one direction, movable and adjustable detaining devices for the master member for making bulb and time exposures and controlled by the operating member, of a retarding device for governing the movement of the master member, and setting devices coöperating with the detaining devices and with the retarding device for varying their relation to the master member.

THEODOR BRUECK.

Witnesses:
C. M. WAGNER,
J. HAMMELE.